(12) United States Patent
Suit

(10) Patent No.: US 11,748,147 B1
(45) Date of Patent: *Sep. 5, 2023

(54) INTRA APPLICATION CONTAINER DIRECT COMMUNICATION PROTOCOL

(71) Applicant: International Business Machines Corporation, Armonk, NY (US)

(72) Inventor: John Michael Suit, Mount Airy, MD (US)

(73) Assignee: International Business Machines Corporation, Armonk, NY (US)

(*) Notice: Subject to any disclaimer, the term of this patent is extended or adjusted under 35 U.S.C. 154(b) by 86 days.

This patent is subject to a terminal disclaimer.

(21) Appl. No.: 17/672,635

(22) Filed: Feb. 15, 2022

Related U.S. Application Data

(63) Continuation of application No. 16/420,101, filed on May 22, 2019, now Pat. No. 11,249,783.

(60) Provisional application No. 62/675,471, filed on May 23, 2018.

(51) Int. Cl.
| | |
|---|---|
| *G06F 9/455* | (2018.01) |
| *H04L 67/10* | (2022.01) |
| *H04L 67/14* | (2022.01) |

(52) U.S. Cl.
CPC .......... *G06F 9/45558* (2013.01); *H04L 67/10* (2013.01); *H04L 67/14* (2013.01); *G06F 2009/45579* (2013.01); *G06F 2009/45583* (2013.01); *G06F 2009/45595* (2013.01)

(58) Field of Classification Search
CPC ......... G06F 9/5077; G06F 2009/45583; G06F 2009/4557; G06F 2009/45595; G06F 9/45558; H04L 69/329; H04L 67/12; H04L 67/02; H04L 67/14; H04L 67/10
See application file for complete search history.

(56) References Cited

U.S. PATENT DOCUMENTS

| | | | |
|---|---|---|---|
| 10,263,787 B1* | 4/2019 | Gelman | G06F 21/335 |
| 10,356,128 B1* | 7/2019 | Lango | H04L 63/0263 |
| 10,581,873 B2* | 3/2020 | Surcouf | H04L 63/1408 |
| 11,044,229 B2* | 6/2021 | Lan | G06F 21/44 |
| 2006/0143715 A1* | 6/2006 | Chow | G06F 21/629 726/27 |
| 2015/0128131 A1* | 5/2015 | Cao | G06F 9/45558 718/1 |
| 2017/0208137 A1* | 7/2017 | Kirkpatrick | G06F 8/61 |
| 2018/0167217 A1* | 6/2018 | Brady | H04L 67/34 |
| 2018/0176255 A1* | 6/2018 | Bansal | H04L 63/20 |
| 2018/0359218 A1* | 12/2018 | Church | H04L 43/062 |
| 2019/0020665 A1* | 1/2019 | Surcouf | H04L 67/10 |

(Continued)

*Primary Examiner* — Ninos Donabed

(57) ABSTRACT

An example operation may include a method comprising one or more of starting a communication session by a first application container, initiating a poll, by the first application container, when the first application container has data in its queue, responding, by at least one second application container, data, wherein the data includes one or more of an identification, a state, a percentage of utilized resources by type, a list of data elements in a queue of the application container, a list of data elements in a queue, and data that is pre-allocated to be shared, requesting the data, by the at least one second application container, and ending the communication session when one or more of the first application container sends a FIN, and the at least one second application container sends a FIN.

17 Claims, 4 Drawing Sheets

(56) References Cited

U.S. PATENT DOCUMENTS

| | | | | |
|---|---|---|---|---|
| 2019/0199687 A1* | 6/2019 | Lan | ......................... | G06F 21/53 |
| 2019/0273746 A1* | 9/2019 | Coffing | .................. | G06Q 20/40 |
| 2019/0306196 A1* | 10/2019 | Lango | ................... | G06F 21/575 |
| 2019/0349205 A1* | 11/2019 | Brady | ..................... | H04L 67/34 |
| 2020/0403860 A1* | 12/2020 | Lewis | ..................... | H04L 41/40 |

* cited by examiner

US 11,748,147 B1

INTRA APPLICATION CONTAINER DIRECT COMMUNICATION PROTOCOL

CROSS-REFERENCE TO RELATED APPLICATIONS

This application is a continuation of U.S. patent application Ser. No. 16/420,101, filed on May 22, 2019, now U.S. Pat. No. 11,249,783, issued on Feb. 15, 2022, which claims priority to U.S. Provisional Patent Application No. 62/675,471, filed on May 23, 2018, the entire disclosures of which are incorporated by reference herein.

TECHNICAL FIELD

This application generally relates to container communication, and more specifically a lightweight communication protocol, specifically designed for container to container communication.

BACKGROUND

The management of application container interaction on multiple devices using an Intra container communication protocol for direct container communication is described. A method includes, for a set of applications containers on multiple devices and based on certain conditions, determining available peer containers. Each available peer container defines a set of available communication topics and a set of interaction communication parameters defining boundaries of interactions between the applications containers. The method further includes identifying one or more changes in the certain conditions as a result of communications having occurred.

SUMMARY

The present application provides a system and method for Intra-container communication protocol for direct application container communication. Application containers are designed to encompass the minimum processing computing structure (such as the minimum components of a database), for the purposes of discrete isolation of available resources and portability. Containers act much in the way as virtual machines, without the need for a full operating system and application stack, with the exception of only those applications required for a specific function. These discrete application containers would directly benefit from the ability to communicate with each other for the purposes of sharing knowledge or processing results which would benefit the other, without having to report the results through several layers of operating system and enterprise infrastructure, for example. Because application container by design must be extraordinarily efficient, a communication protocol must be equally efficient in it design and usage.

An example operation may include a method comprising one or more of starting a communication session by a first application container, initiating a poll, by the first application container, when the first application container has data in its queue, responding, by at least one second application container, data, wherein the data includes one or more of an identification, a state, a percentage of utilized resources by type, a list of data elements in a queue of the application container, a list of data elements in a queue, and data that is pre-allocated to be shared, requesting the data, by the at least one second application container, and ending the communication session when one or more of the first application container sends a FIN, and the at least one second application container sends a FIN.

Another operation may include a system comprising a first application container containing a processor, wherein the processor is configured to one or more of start a communication session by the first application container, initiate a poll, by the first application container, when the first application container has data in its queue, respond, by at least one second application container, data, wherein the data includes one or more of an identification, a state, a percentage of utilized resources by type, a list of data elements in a queue of the application container, a list of data elements in a queue, and data that is pre-allocated to be shared, request the data, by the at least one second application container, and end the communication session when at least one of the first application container sends a FIN, and the at least one second application container sends a FIN.

A further operation may include a non-transitory computer readable medium comprising instructions, that when read by a processor, cause the processor to perform one or more of starting a communication session by a first application container, initiating a poll, by the first application container, when the first application container has data in its queue, responding, by at least one second application container, data, wherein the data includes one or more of an identification, a state, a percentage of utilized resources by type, a list of data elements in a queue of the application container, a list of data elements in a queue, and data that is pre-allocated to be shared, requesting the data, by the at least one second application container, and ending the communication session when one or more of the first application container sends a FIN, and the at least one second application container sends a FIN.

DETAILED DESCRIPTION

Figure 1:
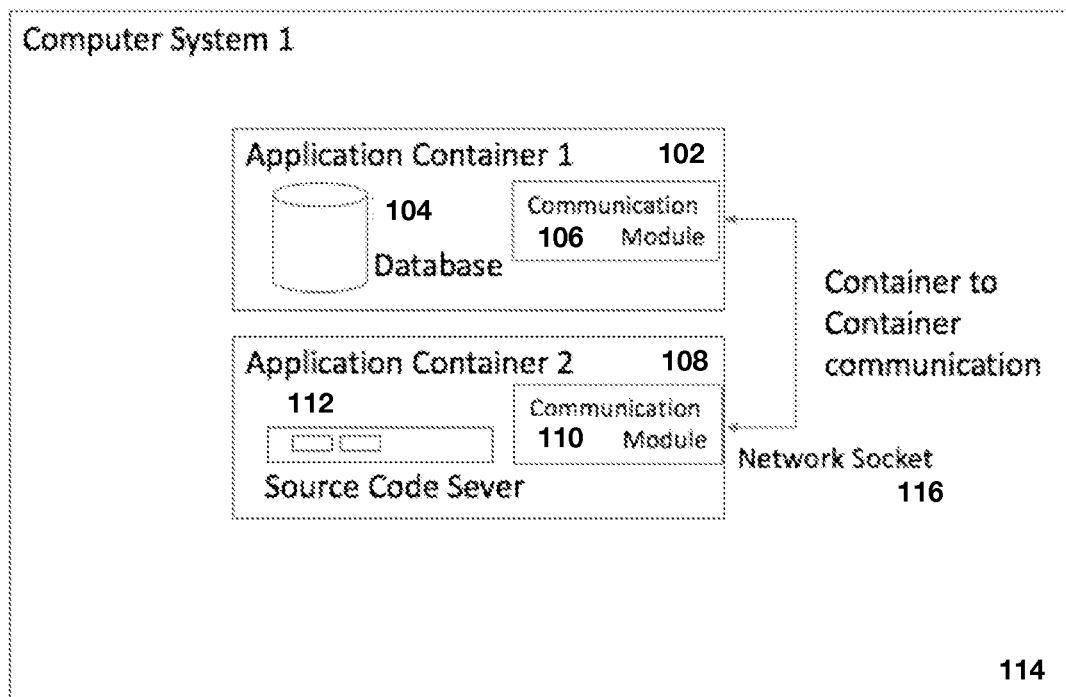
FIG. 1 is a diagram showing a computer system in an exemplary embodiment.

The present application provides a system and method for intra-container communication protocol for direct application container communication. Application containers are designed to encompass the minimum processing, computing structure (such as the minimum components of a database), for the purposes of discrete isolation of available resources and portability. Containers act much in the way as Virtual Machines, without the need for a full operating System and application stack, with the exception of only those applications required to for a specific function. These discrete application containers would directly benefit from the ability to communicate with each other for the purposes of sharing knowledge or processing results which would benefit the other, without having to report the results through several layers of Operating System and enterprise Infrastructure. Communication to and from containers exist as part of the Operating System they are being hosted in, as well as communication between peer containers is an abstract process today, requiring data traverse layers of Operating System and Network components, which may also introduce latency as well as exploit vulnerability from Malware and Ransomware. Disclosed are a brief definition of terms:

Application containers: Application containers are designed to package and run a single service. Container technologies like Docker and Rocket are examples of application containers.

A container consists of an entire runtime environment: an application, plus all its dependencies, libraries and other binaries, and configuration files needed to run it, bundled into one package. By containerizing the application platform and its dependencies, differences in OS distributions and underlying infrastructure are abstracted away.

The following key concepts will be helpful as you begin creating and working with containers.

Container Host: Physical or Virtual computer system configured with the Windows Container feature. The container host will run one or more Windows Containers.

Container Image: As modifications are made to a containers file system or registry—such as with software installation—they are captured in a sandbox. In many cases you may want to capture this state such that new containers can be created that inherit these changes. This what an image is, once the container has stopped either discard that sandbox or convert it into a new container image. For example, imagine that a container is deployed from the Windows Server Core OS image and MySQL is installed into the container. Creating a new image from this container would act as a deployable version of the container. This image would only contain the changes made (MySQL), however it would work as a layer on top of the Container OS Image.

Sandbox: Once a container has been started, all write actions such as file system modifications, registry modifications or software installations are captured in this 'sandbox' layer.

Container OS Image: Containers are deployed from images. The container OS image is the first layer in potentially many image layers that make up a container. This image provides the operating system environment. A Container OS Image is immutable.

Container Repository: Each time a container image is created, the container image and its dependencies are stored in a local repository. These images can be reused many times on the container host. The container images can also be stored in a public or private registry, such as DockerHub, so that they can be used across many different container hosts.

For someone familiar with virtual machines, containers may appear to be incredibly similar. A container runs an operating system, has a file system and can be accessed over a network just as if it was a physical or virtual computer system. However, the technology and concepts behind containers are vastly different from virtual machines.

Hyper-V Isolation—expands on the isolation provided by Windows Server Containers by running each container in a highly optimized virtual machine. In this configuration, the kernel of the container host is not shared with other containers on the same host. These containers are designed for hostile multitenant hosting with the same security assurances of a virtual machine. Since these containers do not share the kernel with the host or other containers on the host, they can run kernels with different versions and configurations (with in supported versions)—for example all Windows containers on Windows 10 use Hyper-V isolation to utilize the Windows Server kernel version and configuration. Running a container on Windows with or without Hyper-V Isolation is a runtime decision. You may elect to create the container with Hyper-V isolation initially and later at runtime choose to run it instead as a Windows Server container.

Communication Protocol: In telecommunication, a communication protocol is a system of rules that allow to or more entities of a communications system to transmit information via any kind of variation of a physical quantity. The protocol defines the rules syntax, semantics and synchronization of communication and possible error recovery methods. Protocols may be implemented by hardware, software, or a combination of both.

Communicating systems use well-defined formats (protocol) for exchanging various messages. Each message has an exact meaning intended to elicit a response from a range of possible responses pre-determined for that particular situation. The specified behavior is typically independent of how it is to be implemented. Communication protocols have to be agreed upon by the parties involved.

Rules Engine: A business rules engine is a software system that executes one or more business rules in a runtime production environment. Rule engines typically support rules, facts, priority (score), mutual exclusion, preconditions, and other functions.

Rule engine software is commonly provided as a component of a business rule management system which, among other functions, provides the ability to: register, define, classify, and manage all the rules, verify consistency of rules definitions, define the relationships between different rules, and relate some of these rules to IT applications that are affected or need to enforce one or more of the rules.

Query Engine: A semantic query language for databases, able to retrieve and manipulate data stored in Resource Description Framework (RDF) format. It was made a standard by the RDF Data Access Working Group (DAWG) of the World Wide Web Consortium, and is recognized as one of the key technologies of the semantic web.

Implementations for multiple programming languages exist. There exist tools that allow one to connect and semi-automatically construct a SPARQL query for a SPARQL endpoint, for example ViziQuer. In addition, there exist tools that translate SPARQL queries to other query languages, for example to SQL and to XQuery.

It allows users to write queries against what can loosely be called "key-value" data or, more specifically, data that follow the RDF specification of the W3C. Thus, the entire database is a set of "subject-predicate-object" triples. This is analogous to some NoSQL databases' usage of the term "document-key-value", such as MongoDB.

In SQL relational database terms, RDF data can also be considered a table with three columns—the subject column, the predicate column, and the object column. The subject in RDF is analogous to an entity in a SQL database, where the data elements (or fields) for a given business object are placed in multiple columns, sometimes spread across more than one table, and identified by a unique key. In RDF, those fields are instead represented as separate predicate/object rows sharing the same subject, often the same unique key, with the predicate being analogous to the column name and the object the actual data. Unlike relational databases, the object column is heterogeneous: the per-cell data type is usually implied (or specified in the ontology) by the predicate value. Also, unlike SQL, RDF can have multiple entries per predicate. For example, one could have multiple child entries for a single person, and can return collections of such objects, like children.

Thus, SPARQL provides a full set of analytic query operations such as JOIN, SORT, AGGREGATE for data whose schema is intrinsically part of the data rather than requiring a separate schema definition. However, schema information (the ontology) is often provided externally, to allow joining of different datasets unambiguously. In addition, SPARQL provides specific graph traversal syntax for data that can be thought of as a graph.

Temporal Storage: A distributed system like grid can be viewed as hypothetical infinite storage system for storing large data entities. Frequently these large data entities cannot be stored in one unique location. A temporal storage space managed as a collaborative cache system where clients have a perception of this space as an unlimited temporal storage capacity. They use the temporal storage space to share and to reuse large data entities in a distributed way. Temporal storage space is composed of a set of autonomous caches that work cooperatively with individual caches are generic cache services deployed inside organizations and a specialized service to coordinate global operations that facilitate the cooperation between caches.

Application programming interface (API): In computer programming, an application programming interface (API) is a set of subroutine definitions, protocols, and tools for building application software. In general terms, it is a set of clearly defined methods of communication between various software components. A good API makes it easier to develop a computer program by providing all the building blocks, which are then put together by the programmer. An API may be for a web-based system, operating system, database system, computer hardware or software library. An API specification can take many forms, but often includes specifications for routines, data structures, object classes, variables or remote calls. POSIX, Microsoft Windows API, the C++ Standard Template Library and Java APIs are examples of different forms of APIs. Documentation for the API is usually provided to facilitate usage.

Just as a graphical user interface makes it easier for people to use programs, application-programming interfaces make it easier for developers to use certain technologies in building applications. By abstracting the underlying implementation and only exposing objects or actions the developer needs, an API simplifies programming. While a graphical interface for an email client might provide a user with a button that performs all the steps for fetching and highlighting new emails, an API for file input/output might give the developer a function that copies a file from one location to another without requiring that the developer understand the system operations occurring behind the scenes.

Libraries and frameworks: An API is usually related to a software library. The API describes and prescribes the expected behavior (a specification) while the library is an actual implementation of this set of rules. A single API can have multiple implementations (or none, being abstract) in the form of different libraries that share the same programming interface. The separation of the API from its implementation can allow programs written in one language to use a library written in another. For example, because Scala and Java compile to compatible bytecode, Scala developers can take advantage of any Java API.

APIs use can vary depending on the type of programming language involved. An API for a procedural language such as Lua could primarily consist of basic routines to execute code, manipulate data or handle errors, while an API for an object-oriented language such as Java would provide a specification of classes and their class methods.

Language bindings may also be APIs. By mapping the features and capabilities of one language to an interface implemented in another language, a language binding allows a library or service written in one language to be used when developing in another language. Tools such as SWIG and F2PY, a Fortran-to-Python interface generator, facilitate the creation of such interfaces.

An API can also be related to a software framework: a framework can be based on several libraries implementing several APIs, but unlike the normal use of an API, the access to the behavior built into the framework is mediated by extending its content with new classes plugged into the framework itself. Moreover, the overall program flow of control can be out of the control of the caller and in the hands of the framework via inversion of control or a similar mechanism.

Referring to FIG. 1, a computer system in one example of the current embodiment 100. The computer system 1 114 contains two application containers 102 and 108. The communication between the containers is performed by a network socket 116. A communication module 106 in application container 1 102 and a communication module 110 in application container 2 108 is tasked with handling the container to container communication. Application container 1 102 contains a database 104 which includes Type, Priority, and State information of the hosted container. A source code server 112 resides in application container 2.

Figure 2:
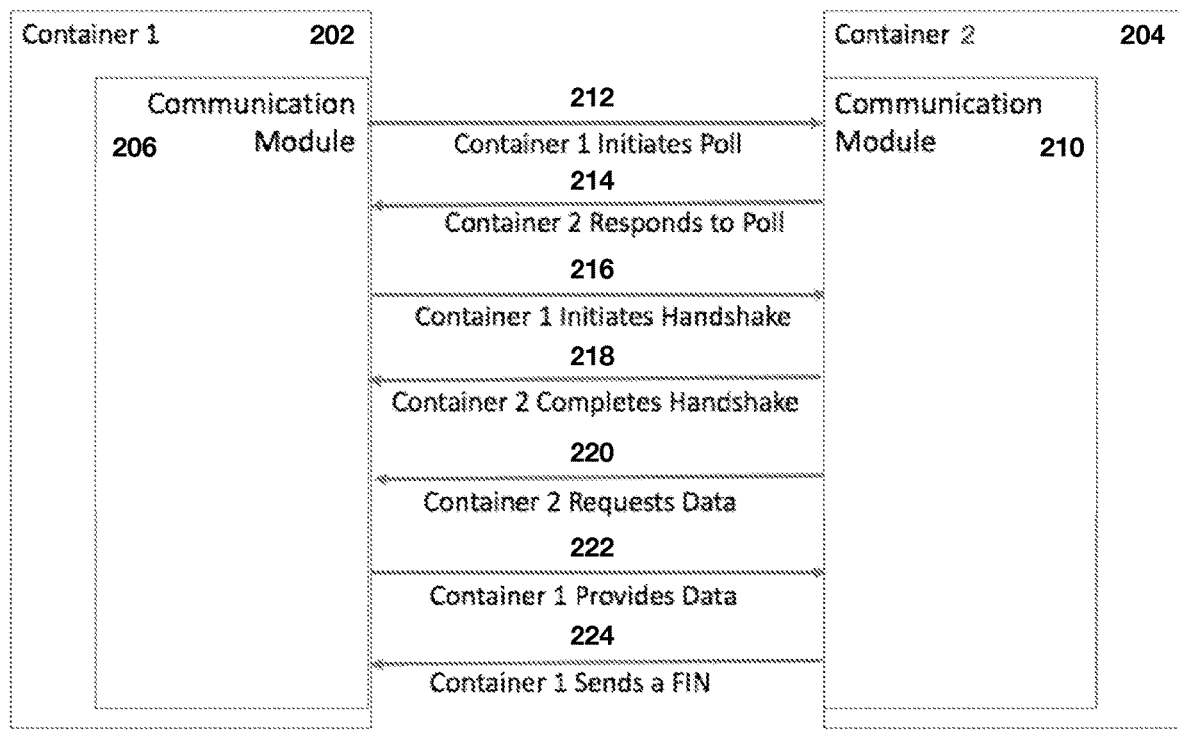
FIG. 2 shows a message flow between two containers in an exemplary embodiment.

Referring to FIG. 2, a message flow between two containers in one example of the current embodiment 200. Two containers 202 and 204 are shown, each containing a respective communication module 206 and 210.

Figure 3:
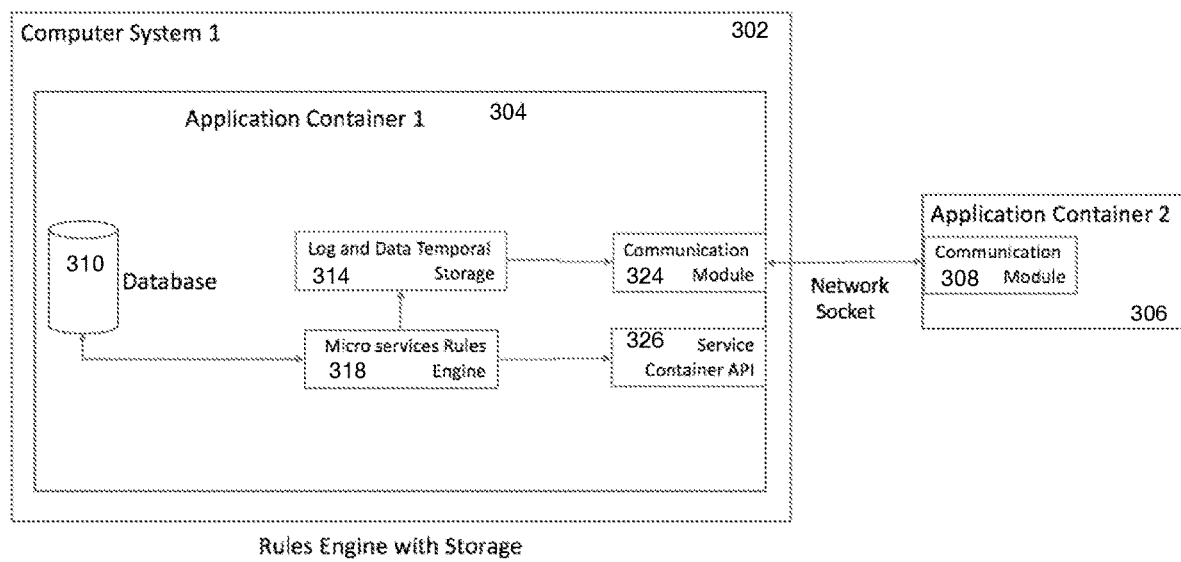
FIG. 3 is a diagram showing an arrangement of first application container and a second application container in an exemplary embodiment.

The proposed method bypasses those mechanisms that would provide a conveyance for extraneous network traffic, time, and threats. In order for the most efficient use of the container to be achieved with the most value of having container to container communication with the ability to share data and state information. In order to achieve this, a micro services rules engine is required as well as a storage location to persist the data, state, and other identification information needed to provide information to a peer application container. The Micro Services Rules engine 318 makes a determination based on observed API requests received by the container while the container's application is in operation. For example, if an API request is received the Service container API 326, and the request is responded to by the container application, the Services Rules engine 318 will decide, based on the rules to copy that data or let it pass. The Services Rules engine 318 should be considered "inline" between the Service container API 318 and the Database 310 in FIG. 3.

The Micro Services Query engine 318 will request via API Identification 326, Type, Priority, and State information from the hosted application Database 310, for example, within the container. Both Observed data as well as requested data is persisted in the Log and Data Temporal storage 314 for Container 302 to Container 306 communication.

In an alternate form of the application, if an API request is received the Service container API 326, and the request is responded to by the container application, the Services Rules engine 318 will automatically act as an inline conduit to provide the data to the application, because the connection is authenticated and was already established prior to the data request. The Services Rules engine 318 should be considered "inline" between the Service container API 318 and the Database 310 in FIG. 3.

The Micro Services Query engine 318 will request via API Identification 326, Syslog data, SQL Alerts, and Trace Files from the hosted application Database 310, for example, within the container. Both Observed data as well as requested data is persisted in the Log and Data Temporal storage 314 for Container 302 to Container 306 communication. This is necessary because of the peer relationship; tradition-reporting destinations may not be available.

Figure 4:
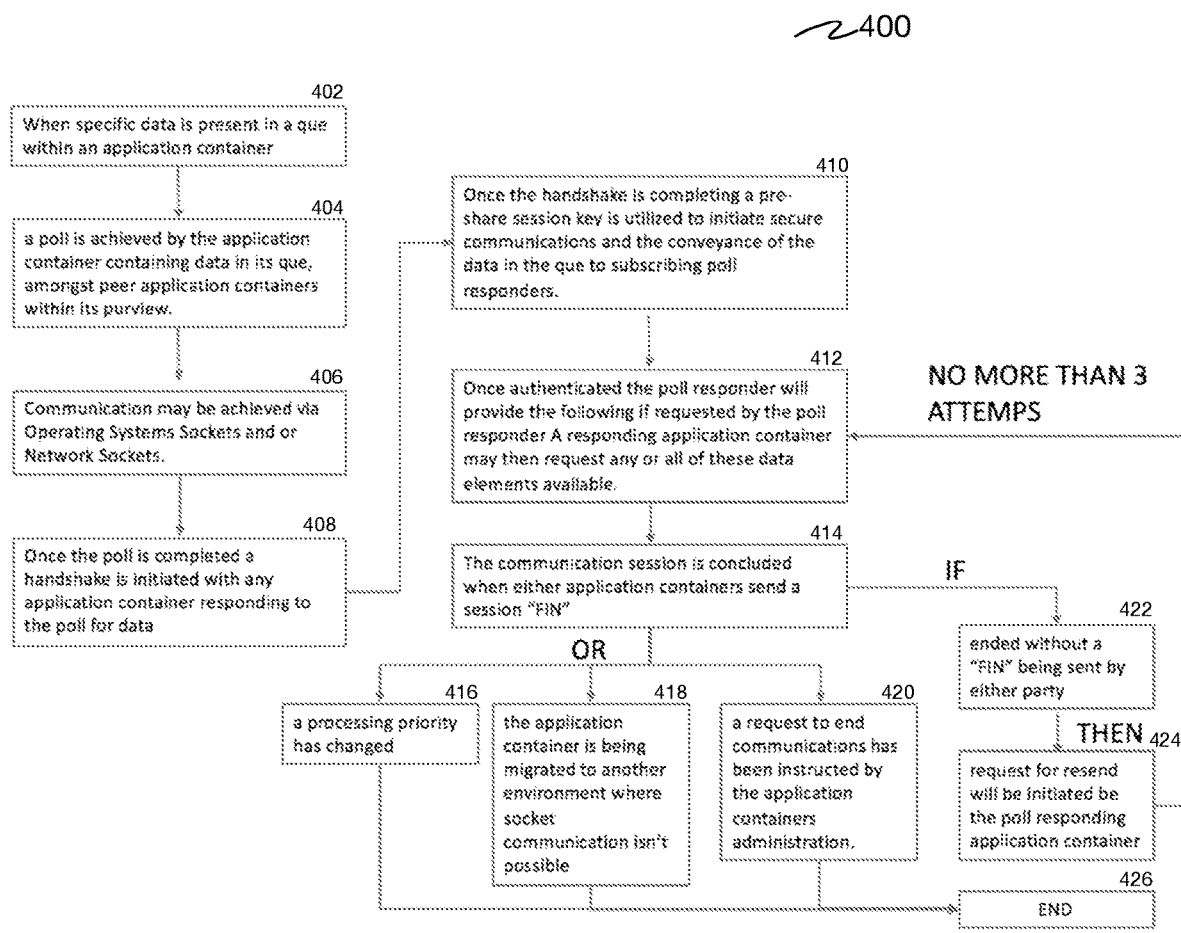
FIG. 4 a flowchart of a lightweight communication protocol, specifically designed for container to container communication in according with one or more embodiments.

Referring to FIG. 4, a lightweight communication protocol, specifically designed for container to container communication 400. When specific data is present in a queue within an application container 318, a poll is achieved by the application container containing data in its queue, amongst peer application containers within its purview 404. Communication may be achieved via Operating Systems Sockets and or Network Sockets 406. Once the poll is completed a handshake is initiated with any application container responding to the poll for data 408. Once the handshake is completing a pre-share session key is utilized to initiate secure communications and the conveyance of the data in the queue to subscribing poll responders 410. Once authenticated the poll responder will provide the following if requested by the poll responder (Application Container Identification, State, percentage of utilized allocated resources by type, list of data elements in the queue, any data that is pre-allocated to be shared with another peer container.) A responding application container may then request any or all of these data elements available 412. This achieved by a (get data type:"data element"). Data is transferred by a binary get from the requesting responding application container. The communication session is concluded when either application containers send a session "FIN" 414. This may occur under several conditions, such as a processing priority has changed, the application container is being migrated to another environment where socket communication isn't possible, or a request to end communications has been instructed by the application containers administration. If a session is ended without a "FIN" being sent by either party 422, a request for resend will be initiated by the poll responding application container 424, and if there are no more than 3 attempts, the poll responder will provide the data. This achieved by a (get data type:"data element"). If a processing priority has changed 416, The process ends 426. If the application container is being migrated to another environment where socket communication is not possible 418, the process ends 426. If a request to end communication has been instructed by the application container's administration 420, the process ends 426.

What is claimed is:

1. A method, comprising:
   starting a communication session by a first application container, the first application container implementing a micro services engine managing communication between the first application container and a second application container in a same computer system;
   receiving, by the micro services engine of the first application container, data sent by the second application container in response to a poll, wherein the data sent by the second application container includes:
      an Application Programming Interface (API) identification,
      a state,
      a percentage of utilized resources by type,
      a list of data elements in a queue of the application container,
      a list of data elements in a queue, or
      data that is pre-allocated to be shared;
   sending a finish message ending the communication session when a processing priority changes, and
   resending the poll when the communication session ends without one or more of:
      the first application container not sending the finish message, and
      the second application container not sending the finish message;
   wherein the micro service engine decides whether to copy or not to copy the data sent by the second application container to a database of the first container.

2. The method of claim 1, wherein the initiating the poll further comprises:
   sending the poll via at least one of an operating system socket and a network socket.

3. The method of claim 1, comprising:
   initiating a handshake with the second application container to complete the poll.

4. The method of claim 1, wherein the micro services engine and the database are configured in-line with each other.

5. The method of claim 1, comprising:
   receiving the data via a Service Container API of the first application container.

6. The method of claim 1, comprising:
   sending, by the first application container, the poll to the second application container when the first application container has data in its queue.

7. A system, comprising:
   a first application container that contains at least one processor that implements a micro services engine, the micro services engine manages communication between the first application container and a second application container in a same computer system, wherein the at least one processor is configured to:
   start a communication session with the second application container,
   receive, in response to a poll, data from the second application container, wherein the data sent by the at least one second application container includes:
      an Application Programming Interface (API) identification,
      a state,
      a percentage of utilized resources by type,
      a list of data elements in a queue of the application container,
      a list of data elements in a queue, or
      data that is pre-allocated to be shared;
   send a finish message ending the communication session when a processing priority changes, and
   resend the poll when the communication session ends without one or more of:
      the first application container not sending the finish message, and
      the second application container not sending a the finish message;
   wherein the micro service engine decides whether to copy or not to copy the data sent by the second application container to a database of the first container.

8. The system of claim 7, wherein, when the processor is to send the pool, the processor further is to:
   send the poll via at least one of an operating system socket and a network socket.

9. The system of claim 7, wherein the processor further is to:
   initiate a handshake with the second application container to complete the poll.

10. The system of claim 7, wherein the micro services engine and the database are configured in-line with each other.

11. The system of claim 7, wherein the processor further is to:
receive the data via a Service Container (API) of the first application container.

12. The system of claim 7, wherein the processor further is to:
send the poll to the second application container when the first application container has data in its queue.

13. A non-transitory computer readable medium comprising instructions that when executed by at least one processor cause the at least one processor to perform:
starting a communication session by a first application container, the first application container implementing a micro services engine manacling communication between the first application container and a second application container in a same computer system;
sending, by the first application container, a poll to a second application container when the first application container has data in its queue;
receiving, by the micro services engine of the first application container, data sent by the second application container in response to the poll, wherein the data sent by the at least one second application container includes:
an Application Programming Interface (API) identification,
a state,
a percentage of utilized resources by type,
a list of data elements in a-the queue of the application container,
a list of data elements in a queue, or
data that is pre-allocated to be shared;
sending a finish message ending the communication session when a processing priority changes, and
resending the poll when the communication session ends without one or more of:
the first application container not sending the finish message, and
the second application container not sending a the finish message;
wherein the micro service engine decides whether to copy or not to copy the data sent by the second application container to a database of the first container.

14. The non-transitory computer readable medium of claim 13, wherein the instructions further cause the at least one processor to perform:
sending the poll via at least one of an operating system socket and a network socket.

15. The non-transitory computer readable medium of claim 13, wherein the instructions further cause the at least one processor to perform:
initiating a handshake with the second application container to complete the poll.

16. The non-transitory computer readable medium of claim 13, wherein the micro services engine and the database are configured in-line with each other.

17. The non-transitory computer readable medium of claim 13, wherein the instructions further cause the at least one processor to perform:
receiving the data via a Service Container API of the first application container.

* * * * *